July 5, 1955
D. L. ARENBERG
2,712,638
SINGLE-CRYSTAL ULTRASONIC SOLID DELAY LINES
USING MULTIPLE REFLECTIONS
Filed Sept. 18, 1951
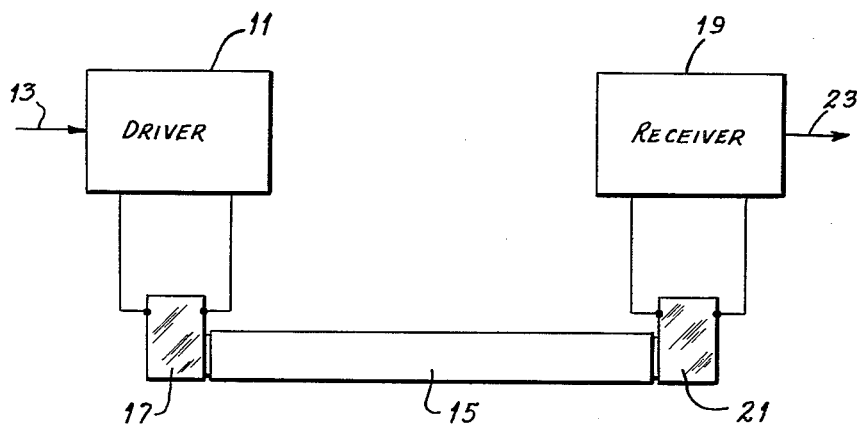
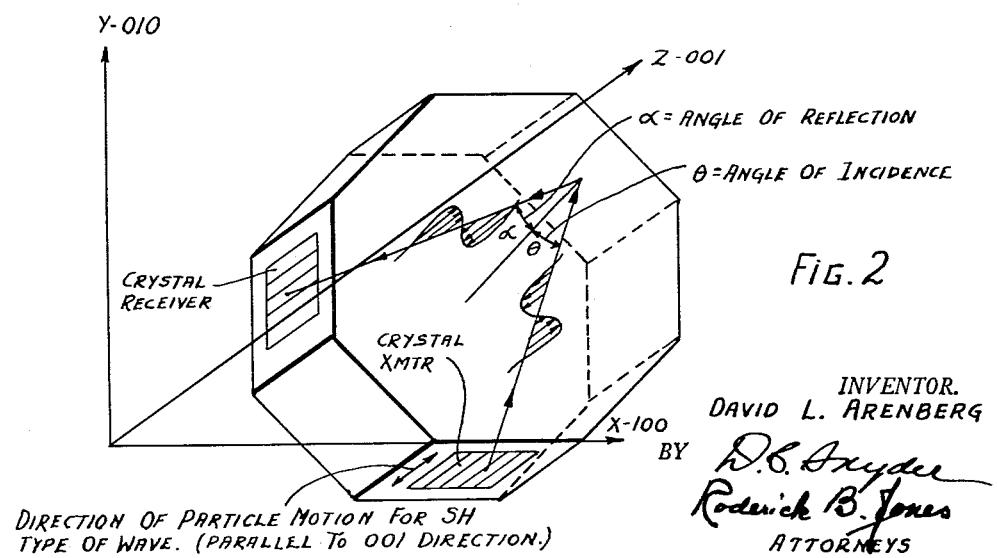
INVENTOR.
DAVID L. ARENBERG United States Patent Office 2,712,638
Patented July 5, 1955

2,712,638

SINGLE-CRYSTAL ULTRASONIC SOLID DELAY LINES USING MULTIPLE REFLECTIONS

David L. Arenberg, Rochester, Mass.

Application September 18, 1951, Serial No. 247,185

9 Claims. (Cl. 333—30)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in delay lines, and more particularly pertains to improvements in multiple reflection ultrasonic solid delay lines.

In many electronic applications it is desirable to delay a signal for a short period of time of the order of a few microseconds or a few milliseconds. This can be done by the use of so-called electronic delay lines made up of inductors and capacitors. In some instances, an ultrasonic delay line is more applicable. These ultrasonic delay lines comprise a transmission medium usually in the form of a bar or rod of suitable material with a piezoelectric crystal mounted at either end thereof. The mounting of the crystals can be accomplished by cementing them to the ends of the rod of the transmission material or they may be held against the rod by means of a spring and an oil film can be introduced between the crystals and the rod to assure good mechanical contact therebetween.

In the use of this type of delay line a signal is applied to one of the piezoelectric crystals, causing this crystal to vibrate mechanically. These mechanical vibrations travel axially along the rod of transmission material and upon reaching the other end thereof cause mechanical stresses in the second piezoelectric crystal. These mechanical stresses cause an electrical signal to appear between the two faces of the crystal in accordance with the well known piezoelectric phenomena. This electrical signal appearing across the crystal is substantially identical to the signal applied to the first crystal but occurs later in time by an amount equal to the time required for the signal to travel the length of the rod of transmission material. In previous applications of ultrasonic transmission lines it has been found that, for optimum operation of the lines, the signal applied to the transmitting crystal should be of an oscillatory nature and have a frequency in the region of 10 to 30 megacycles per second and the transmitting and receiving crystals should be designed to oscillate mechanically freely at the carrier frequency. The mechanical oscillation of the transmitting crystal will cause compressional or transverse waves of a frequency of 10 to 30 megacycles to travel down the rod of transmission material.

One disadvantage of this type of delay line is that in previously employed transmission material the attenuation of the signal in delay lines having a time delay of more than a few microseconds may be high enough so that the signal at the receiving crystal is at too low an energy level. One method of reducing the attenuation of a signal passing through a supersonic delay line to a relatively low level is the use of a single crystal as such delay line. Heretofore, a single crystal of a material having substantially isotropic compressional wave propagation characteristics has been employed for such purpose. However, there are several disadvantages to crystalline and isotropic media in general. Delay lines using multiple reflection paths in solid isotropic media have used the longitudinal and the shear or transverse modes of propagation. The latter has the same velocity independent of polarization, but there are two modes that behave differently on reflection. At angles other than normal incidence the longitudinal or P type converts to the shear SV type and vice versa. Total conversion is possible at certain angles and delay lines of 400 μsec. have been built of fused quartz by using this mode conversion. The SH shear type of wave is reflected totally at all angles at a solid-air interface and on using pure-shear-mode-generating isotropic crystals, delay lines with rectangular or radial symmetry have been built. But the disadvantages of using isotropic materials is the serious limitation in available media with low velocity, low absorption, low cost and availability. Only one material, fused quartz has been found suitable.

The principal object of the subject invention is to provide a transmission material characterized by its low velocity, attenuation, absorption and cost and by its wide availability.

Another object is to provide a transmission material comprising a single crystal anisotropic solid adapted for multiple reflection of a signal without serious attenuation.

Other objects and many of the attendant advantages of this invention will be readily appreciated as the same becomes better understood by reference to the following detailed description when considered in connection with the accompanying drawing wherein:

Fig. 1 is a schematic diagram in block form of a single crystal anisotropic solid delay line using multiple reflections, showing a preferred embodiment of the invention; and Fig. 2 shows diagrammatically particle motion and direction propagation in a properly oriented crystal using a radial symmetry type of delay line.

Single crystals of solids are elastically anisotropic and have different velocities of propagation in different directions. There are three types of waves having different velocities along any given direction, so that, on reflection at a plane surface, the waves can propagate at angles different from the angles of incidence and the energy distributed in each mode can be changed, the angles of reflection being determined by Snell's law. Consequently, computing a design that will allow only one wave to be propagated at any reflection point may be difficult in the case of the type that uses mode conversion from P to SV. In fact, such computation may be impossible.

However, in the case of the SH shear type of wave, certain classes of crystals have been found to be isotropic when the wave is propagated in certain planes only. Two prominent crystal classes of this nature are the cubic and the hexagonal. For example, propagation in a plane perpendicular to any 001 axis in a cubic crystal of a shear wave in which the particle motion is parallel to the 001 axis will be of this type and will have a constant velocity with no components of the other two wave types. Hence a delay line using a single cubic crystal in the form of a disc or plate whose large face is normal to the 001 direction can be made using any two-dimensional pattern of an isotropic solid such as the rectangular or radial symmetry patterns in isotropic media and SH shear generating transducers.

A typical delay line is shown in the drawing, wherein a driver circuit 11 is coupled to a circuit where a signal is to be delayed by conductor 13. Anisotropic crystal 15 is coupled to the driver circuit through piezoelectric crystal 17 and to a receiver circuit 19 through piezoelectric crystal 21, said crystal 15 being mounted between said crystals 17 and 21. The conductor 23 returns the signal from the receiver to the circuit wherein the signal is being delayed. In the operation of the delay line, the signal to be delayed is applied to driver circuit 11 by the way of conductor 13. Said driver circuit causes the applied signal to amplitude modulate a signal of frequency from 10 to 30 megacycles. This modulated signal is applied to crystal 17, causing this crystal to oscillate mechanically at a frequency determined by the frequency of the signal from the driver circuit with an amplitude determined by the amplitude of the signal from the driver circuit. The SH shear type of waves set up travel in a plane perpendicular to an 001 axis, particle motion being parallel to the 001 axis, are reflected multiply without appreciable attenuation or absorption and the signal is then fed to the receiver circuit 19 through crystal 21. Said receiver circuit demodulates the signal and provides at conductor 23 a signal that is substantially the same as the signal applied to conductor 13. The time delay between the time of occurrence of a signal applied at conductor 13 and the time of occurrence of a signal appearing at conductor 23 depends upon and may be calculated from the total physical length of the multiple reflection path in the crystal 15 and the speed of transmission of ultrasonic energy in this crystal.

The speed of transmission of ultrasonic energy in crystal 15 will depend primarily upon the type of material of which crystal 15 is made. Previous delay lines have employed fused material such as fused quartz, metal, or a single pure crystal of an isotropic solid. The subject device uses a single perfect crystal of an anisotropic solid, reflecting the wave multiply therein.

The foregoing applies also to hexagonal crystals, or to other crystals whose matrix of elastic constants can be put in the form $$\begin{matrix} C_{11} & C_{12} & C_{13} & 0 & 0 & C_{16} \\ C_{21} & C_{22} & C_{23} & 0 & 0 & C_{26} \\ C_{31} & C_{32} & C_{33} & 0 & 0 & C_{36} \\ 0 & 0 & 0 & C_{44} & 0 & 0 \\ 0 & 0 & 0 & 0 & C_{55} & 0 \\ C_{61} & C_{62} & C_{63} & 0 & 0 & C_{66} \end{matrix}$$

and where $C_{44} = C_{55}$

The use of a single pure anisotropic crystal for the delay material reduces appreciably the attenuation of a signal travelling through the delay material and causes the signal appearing at the receiving crystal to be substantially identical to the signal applied at the transmitting crystal. While such arrangement provides delay lines of practical length by reason of the multiple reflection afforded and reduces attenuation appreciably, it is not claimed that attenuation is eliminated entirely. Some attenuation of the signal will be present regardless of the type of transmission material employed.

Some anisotropic crystals that have been found to be ideally suited for transmission material in an ultrasonic multple reflection solid delay line are aluminum, magnesium, silver chloride, sodium chloride, magnesium oxide, thallium bromide.

The use of a single anisotropic crystal as the transmission medium is not limited to the particular apparatus or configuration shown in the drawing, and it is not intended that the apparatus shown in the drawing shall in any way limit the scope of the invention. Obviously many modifications and variations of the present invention are possible in the light of the above teachings. It is therefore to be understood that within the scope of the appended claims the invention may be practiced otherwise than as specifically described.

I claim:

1. A system for delaying SH shear-waves for a time interval independent of the period of said waves comprising a single crystal having anisotropic wave propagation characteristics, means for impressing said waves upon said crystal for travel therein in a plane perpendicular to an 001 axis of said crystal, and means for detecting said waves after they have been propagated in said crystal over a distance determined by the desired delay interval.

2. A system for delaying SH shear-type waves for a time interval independent of the period of said waves comprising a single crystal having anisotropic wave propagation characteristics, means for impressing said waves upon said crystal for travel therein in a plane perpendicular to an 001 axis of said crystal and for multiple reflection therein, and means for detecting said waves after they have been propagated in said crystal over a distance determined by the desired delay interval.

3. A system for delaying SH shear-type waves for a time interval independent of the period of said waves comprising a single crystal having anisotropic wave propagation characteristics, a first and a second piezoelectric crystal each mounted on said anisotropic crystal, a driver circuit coupled to said first crystal for impressing said waves upon said anisotropic crystal for travel therein in a plane perpendicular to an 001 axis of said anisotropic crystal, and a receiver circuit coupled to said second crystal for detecting said waves after they have been propagated in said crystal over a distance determined by the desired delay interval.

4. A system for delaying SH shear-type waves for a time interval independent of the period of said waves comprising a single crystal having anisotropic wave propagation characteristics, a first and a second piezoelectric crystal each mounted on said anisotropic crystal, a driver circuit coupled to said first crystal for impressing said waves upon said anisotropic crystal for travel therein in a plane perpendicular to an 001 axis of said anisotropic crystal, and a receiver circuit coupled to said second crystal for detecting said waves after they have been propagated and multiply reflected in said crystal over a distance determined by the desired delay interval.

5. A system for delaying SH shear-type waves comprising a single crystal having anisotropic wave propagation characteristics, said crystal having a plurality of reflecting facets, means for impressing said waves upon said crystal for travel therein in a plane perpendicular to any 001 axis of said crystal and for multiple reflection from said facets, and means for detecting said waves after they have been propagated in said crystal over a distance determined by the desired delay interval.

6. A system for delaying SH shear-type waves comprising a single crystal having anisotropic wave propagation characteristics, means for impressing SH waves upon said crystal for travel therein in a plane having isotropic wave propagation characteristics, said crystal having a plurality of reflecting facets whereby said waves travelling in the desired plane are multiply reflected from said facets, and means for detecting said waves after they have been propagated in said crystal over a distance determined by the desired delay interval.

7. An ultrasonic delay system comprising, a single-crystal having anisotropic wave propagation characteristics and means for impressing SH shear-type waves upon said crystal for travel therein in a plane perpendicular to an 001 axis of said crystal.

8. A supersonic delay system comprising, a single-crystal having anisotropic wave propagation characteristics, and means mounted on said crystal for inducing supersonic energy therein, said means being oriented to direct said energy for travel within said crystal in a plane perpendicular to any 001 axis of said crystal.

9. An ultrasonic delay line comprising, a single cubic crystal having anisotropic wave propagation characteristics, and means mounted on said crystal for inducing ultrasonic energy therein in the SH shear mode of propagation, the direction of propagation of said energy being such that particle motion is parallel to a 001 axis of said crystal.

(References on following page)

References Cited in the file of this patent

UNITED STATES PATENTS

| | | | |
|---|---|---|---|
| 2,263,902 | Percival | Nov. 25, | 1941 |
| 2,467,301 | Firestone | Apr. 12, | 1949 |
| 2,505,515 | Arenberg | Apr. 25, | 1950 |
| 2,512,130 | Arenberg | June 20, | 1950 |
| 2,525,861 | Carlin | Oct. 17, | 1950 |
| 2,540,720 | Forbes | Feb. 6, | 1951 |
| 2,624,804 | Arenberg | Jan. 6, | 1953 |
| 2,633,017 | Smoluchowski | Mar. 31, | 1953 |